Sept. 26, 1967 A. D. LEWIS 3,343,937
APPARATUS FOR FORMING THE OPEN END PORTION
OF SMALL GLASS CONTAINERS
Filed April 13, 1964 4 Sheets-Sheet 1

INVENTOR.
ALBERT D. LEWIS
BY E. J. Holler &
W. A. Schaich
ATTORNEYS

Sept. 26, 1967 A. D. LEWIS 3,343,937
APPARATUS FOR FORMING THE OPEN END PORTION
OF SMALL GLASS CONTAINERS
Filed April 13, 1964 4 Sheets-Sheet 2

INVENTOR.
ALBERT D. LEWIS
BY
E. J. Holler
W. A. Schaich
ATTORNEYS

Sept. 26, 1967  A. D. LEWIS  3,343,937
APPARATUS FOR FORMING THE OPEN END PORTION
OF SMALL GLASS CONTAINERS Filed April 13, 1964  4 Sheets-Sheet 3

INVENTOR.
ALBERT D. LEWIS
BY
*E. J. Holler*
*W. A. Schaich*
ATTORNEYS

United States Patent Office 3,343,937
Patented Sept. 26, 1967

3,343,937
APPARATUS FOR FORMING THE OPEN END PORTION OF SMALL GLASS CONTAINERS
Albert D. Lewis, Toledo, Ohio, assignor to Owens-Illinois, Inc., a corporation of Ohio
Filed Apr. 13, 1964, Ser. No. 360,478
14 Claims. (Cl. 65—274)

The present application is a continuation-in-part of my earlier-filed application, which is now abandoned, Ser. No. 334,485, filed Dec. 30, 1963, assigned to the same assignee as the instant application.

This invention relates to novel and efficient method and apparatus for externally forming prescribed areas of tubular glass blanks, for example, the open end portion of vials and like containers.

An important object of my invention is a provision of apparatus wherein glass vials, or lengths of cylinder-like glass tubes, having selected areas to be formed with a screw-thread or lug-type finish, may be advanced continuously along a prescribed path and without any interruption in such advance and forming the tubes in such areas to create perfectly-contoured full and accurate threads or lug finishes of reduced diameter.

Another object of my invention is the provision of thread-forming or lug-forming dies mounted in vertical array for their reciprocatable horizontal movement a predetermined distance along a path of travel of and with vials and tubes which are externally formed during an interval of their travel, thereby to ensure the formation of fully and accurately contoured threads or lugs in a continuous operation.

Another object of my invention is provision of thread or lug-forming dies mounted one above and the other below a prescribed path of travel of tubular glass blanks together with novel and simple apparatus for effecting various adjustments of the die positions relative to each other as well as the path of travel of the blanks.

Another object of my invention is to provide novel means for rotating both a pair of vertically-aligned forming dies and glass vials at the proper peripheral speeds to ensure satisfactory end forming of the vials.

It is a further object of this invention to provide apparatus of the above-described character including a pair of rotatable threading dies of disc-like contour, each of substantially larger diameter than the tube or vial to be formed and each having a series of thread-shaping channels therein, several of which channels contribute to the threading of each vial.

Other objects will be in part apparent and in part pointed out hereinafter.

Figure 1:
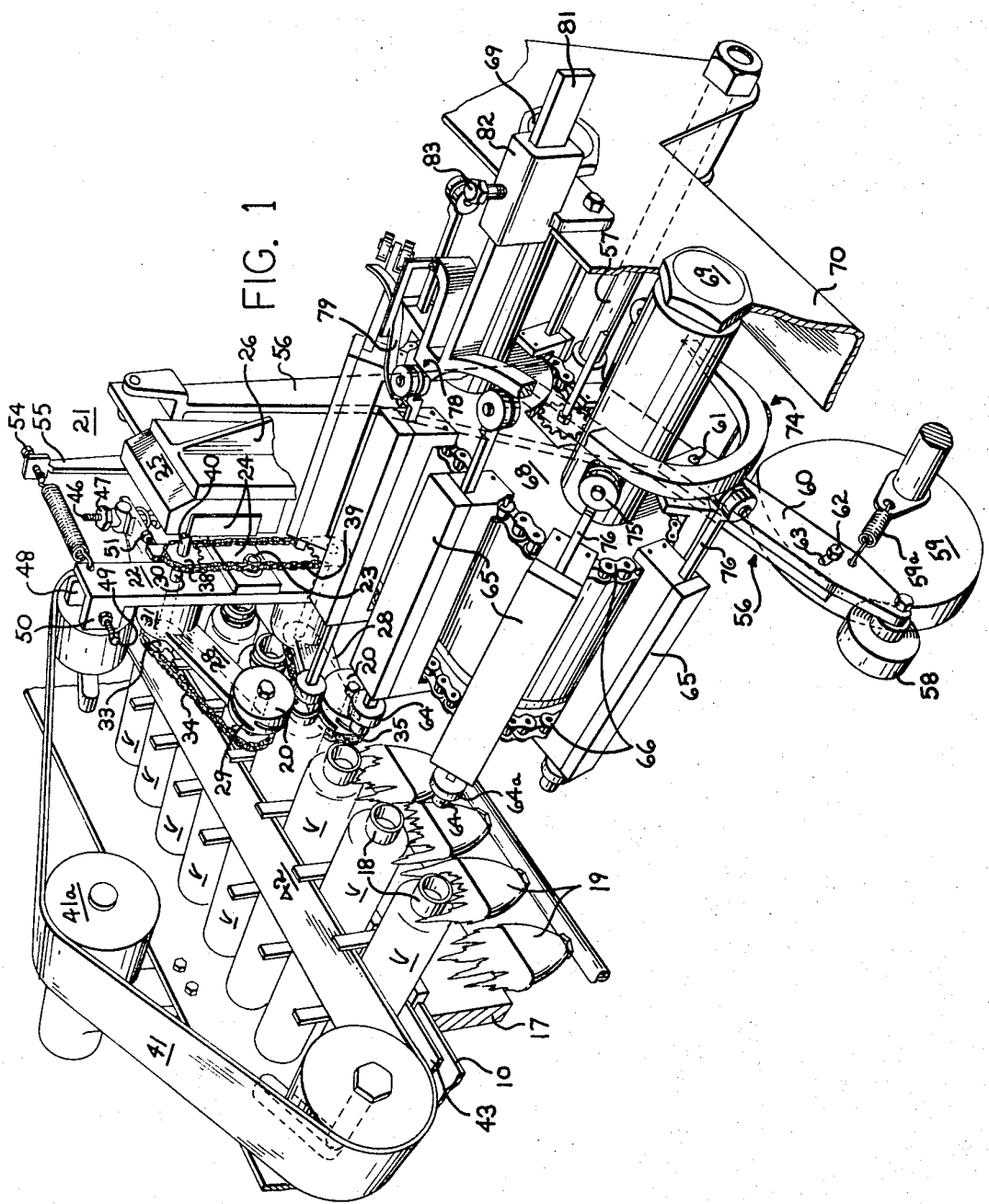
FIG. 1 is a partially schematic perspective view of apparatus embodying my invention.
Figure 4:
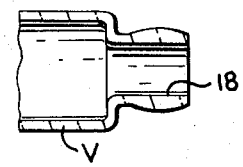
FIG. 4 is a fragmentary sectional view showing the enlarged neck part of a vial which provides the additional glass needed for the thread formation.

The illustrated embodiment of my invention may well be used in conjunction with a vial machine such as that disclosed in Koenig U.S. Patent No. 2,738,622 wherein lengths of cylinder-like glass tubing are reshaped in part by mechanism at the necking station N. My invention may well be positioned to the right hand side of the necking station N and instead of reshaping the vial V end as in the above patent, the area to be reshaped is reduced in diameter and then thickened (see FIG. 4) to provide the additional glass needed for embodiment in the screw-thread T or the lug L which will be formed on the tube. The main frame and tube, or vial, advancing means of the above patent, or any other preferred means, may be utilized with my invention. The finger-type conveyor 10 (FIG. 1) may well be similar to the conveyor 16 of said patent. It rides along the upper side of a horizontal supporting rail 17, being moved continuously by conventional means (not shown), perhaps as in said patent. The glass vials V, or such cylinder-like tubes occupy recumbent positions upon this conveyor 10 with their axes extending in a direction transverse to the conveyor path of travel. The vials V have a diametrically reduced neck portion 18, previously thickened, as shown in FIG. 4, preparatory to screw-threading or lug forming. As the vials advance in a continuous motion to the screw-threading unit (FIG. 1) the neck portions 18 pass through flames provided by burners 19 for the purpose of softening the glass in that area sufficiently that the threading dies 20 may reshape the excess glass on the neck and roll-in the screw-thread T (FIG. 5) or the lug L (FIG. 6). As will be brought out in detail presently, these threading dies 20 advance a short distance with each vial V during the thread or lug rolling step and then return for engagement with the next vial. Also, as will be explained hereinafter, the neck portions 18 are momentarily supported internally against possible collapse, during the screw-threading procedure.

The apparatus for screw-threading these vials V, or perhaps a selected portion of a cylindrical glass tube, as illustrated in a preferred embodiment, comprises a carrier 21 for the pair of dies 20, such as carrier 21 being a vertical bar 22 pivoted medially its length by a horizontal bolt 23 which is affixed to one end of a horizontal two-part slide 24. This slide 24 is mounted in the slide-way 25 of a fixed frame 26 which is secured in a fashion (not shown) to the main frame of the apparatus shown in the Koenig patent. This slide 24 is reciprocated in a horizontal plane in a manner to be described presently.

Figure 2:
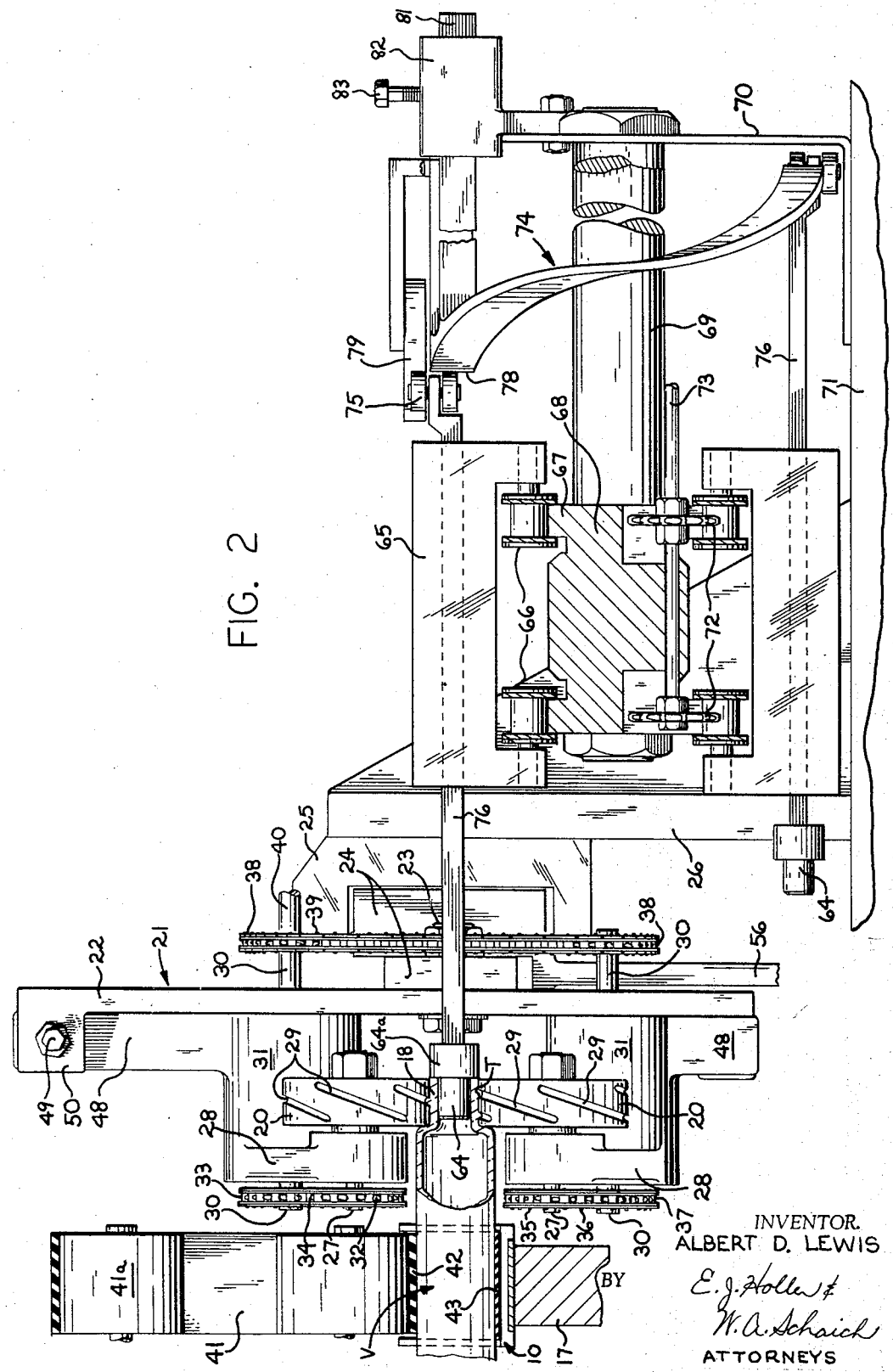
FIG. 2 is a cross-sectional view partly in elevation showing the parts positioned in one embodiment of my invention showing the screw-threading cycle.

The aforementioned two threading dies 20 are positioned one above and the other below the path of travel of the neck portions 18 of the vials and each is secured to a horizontal stub-shaft 27 (FIG. 2) at the free end of an arm 28. Each such die, which is of generally disc-like form, is provided in its periphery with a circumferential series of diagonal channels 29 or grooves which mold or reshape the soft excess glass of the neck to produce a screw thread T. Because these dies are preferably several times the diameter of the neck 18 and advance a short distance with and are rotated by the vial, as will become apparent, presently, each cycle of thread development or formation, will involve engagement of several of the thread producing channels 29 of each die 20, with a vial neck. Thus, formation of full and perfectly dimensioned threads is assured. Also in this connection, it is important and imperative that the relationship between the channels 29 of the dies be initially established with the utmost accuracy and maintained to insure proper registry of successive channels with the screw-thread, as initially formed. Otherwise, a thread properly formed at the outset could very well be obliterated a moment later.

These threading dies 20 rotate on horizontal axes parallel to the longitudinal axes of the vials V, or tubes being, or about to be, worked upon. Preferably these dies are positively driven at the proper peripheral speed in relation to the vial rotation by means substantially as folows. Each die supporting arm 28 is pivoted by means of a horizontal stub-shaft 30 extending through a hub 31, to the vertical bar 22 of the previously named carrier 21. A sprocket 32 on the upper of the previously mentioned stub-shaft 27 which support the threading dies 20, is connected by a sprocket chain 34 to a sprocket 33 on the uppermost of the stub-shafts 30. The lower sprocket 35 opposite the lower die 20 is connected by a sprocket chain 36 to a sprocket 37 carried by the lower stub-shaft 30. At the ends of these stub-shafts 30 opposite the sprockets 35 and 37 are sprockets 38 which are connected together by a sprocket chain 39. A drive shaft 40 imparts power to the upper stub-shaft 30 and through the train of sprockets and chains rotates the dies at a predetermining peripheral speed, such being synchronized in any preferred conventional fashion (not shown) with rotation of the vials V.

These vials V may well be axially rotated by means of a driven endless overhead belt 41 (FIG. 1) having a reach 42 firmly pressing downwardly upon the vials V and a driven lower belt 43 which runs in firm contact with the lower side of the vials. Between these two belts 41 and 43 which move continuously at the proper speed in relation to rotation of the dies, the vials are positively rotated while in engagement with the dies 20. A driven pulley 41a may drive the upper belt 41.

Figure 3:
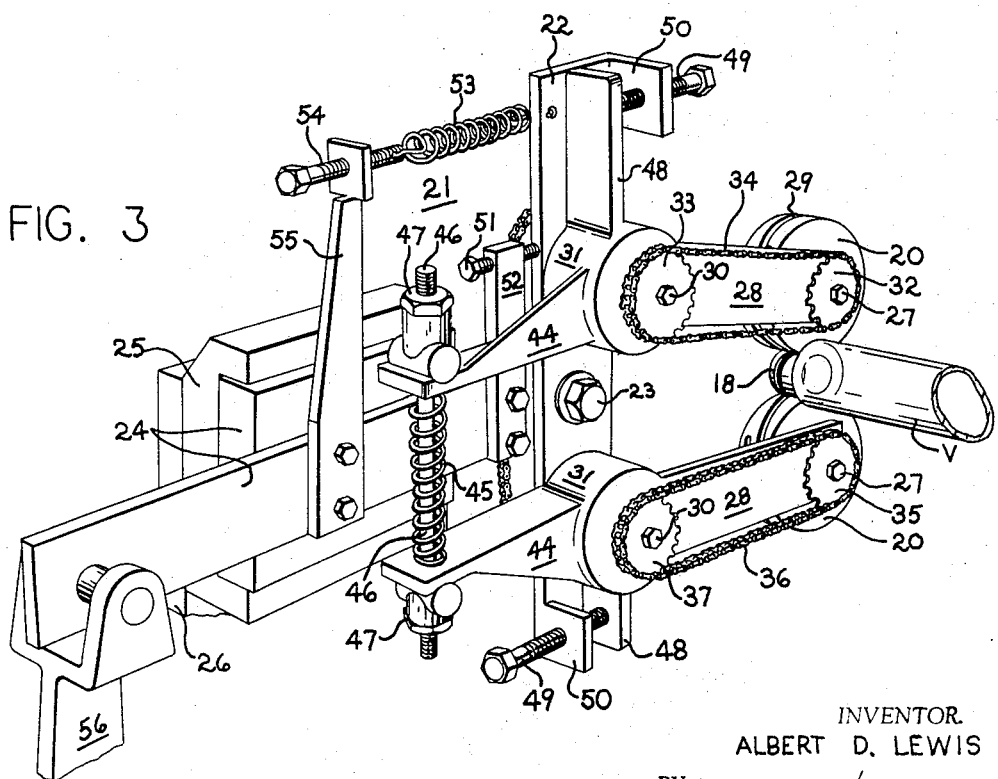
FIG. 3 is a detail perspective view of the side of the apparatus opposite that of FIG. 1.

Because of the possibility that the tube end portion, which is to be formed with a screw-thread or lug finish, may be slightly out-of-round, the dies 20 are free to yield slightly so as to follow precisely the tube contour. To this end the arms 28, which carry the dies 20 and are mounted upon the stub-shafts 30, have finger extensions 44 (FIG. 3), such being yieldingly, yet quite firmly held apart, about as shown, by a coil expansion spring 45. This spring encircles a connector rod 46 which extends through the free end portions of said extensions 44, being secured thereto by adjusting nuts 47 which are threaded onto the rod. The coil spring 45 holds the finger extensions 44 in their outermost relative positions and as is evident, permits a slight degree of die separation when necessary. Additionally, this mechanism, as is obvious, permits spacing the dies 20 to accommodate vials V or tubes of different diameter.

Independent adjustment of the threading dies vertically, relative to the path of advance of the vials, or tubes, to insure proper passage of the latter between the dies during the threading or lug forming operation, is obtained by mechanism comprising a pair of generally vertical arms 48 carried by the hubs 31. These arms extend in opposite directions and near their free ends engage adjusting screws 49 which are threaded through ears 50 or flanges, at opposite ends and sides of the vertical bar 22 of the carrier 21. It is apparent that with adjustment of these screws 49, the hubs 31 are moved about their axes and the threading dies 20 consequently are positioned as desired. Shifting of the dies, as a unit, vertically in relation to the vial conveyor 10, is effected by adjusting a screw 51 which is carried by a fixed bracket 52 rising from the slide 24 and working against the previously mentioned vertical bar 22. A coil pull spring 53 holds the bar 22 and screw 51 interengaged. This spring 53 is connected at one end to the upper end of said vertical bar 22 and at its other end to a tension control screw 54 carried by an arm 55 rising from the slide 24.

In accordance with my invention, the dies 20 move as a unit along a lineal path with each vial V or tube during the actual forming cycle and then return to engage the next following vial. Thus, the dies are afforded adequate forming time in which to produce full accurate threads or enlarged flanges beyond the neck portion.

The relative diameter of the dies and vials is such that several successive thread-forming channels 29 of each die will engage the screw-thread T as it is developed on the vial. Such reciprocation involves a relatively slow advance of the dies during the forming phase, but upon completion thereof, the dies return quickly to initiate another forming cycle. To this end the previously mentioned slide 24 is connected at its free end to a lever 56 which extends downwardly with its lower end, beyond the horizontal supporting shaft 57, carrying a cam roll 58. This roll 58 rides upon a rotating cam 59 properly timed, as to rotation, with the advance of the vials to effect the above-described slow advance and rapid retraction of the dies. A spring 59a holds the roll in contact with the cam. The lower end of this lever, specifically the arm 60 upon which the cam roll 58 is directly mounted, is pivoted by a pin 61 to the lever proper. A bolt 62 and arcuate slot 63 provide means for independently shifting this arm 60 slightly, thereby to vary the angle between the ends of the lever and correspondingly alter the points of initiation and completion of the threading cycle.

It is imperative that the vial or tube be effectively supported against collapse under pressure of threading dies 20 and that such support be effective during the entire forming cycle. Accordingly, my invention embodies an endless series of rod-carried plugs 64 (FIGS. 1 and 2) which are mounted upon horizontal holders 65, these latter supported by a pair of sprocket chains 66 riding upon guide ribs 67 of a carrier member 68. This carrier member 68 is connected by tie-rods 69 to a side wall 70 rising from the base 71, sprockets 72 meshing with the sprocket chains 66 and driven by means (not shown) through the shaft 73 advance the plugs bringing them into axial registration with the vials in the desired sequence. Projection of the plugs into the vials and retraction thereof at proper times, is under the control of a cam 74 with which cam rolls 75 on the rearmost end of the plug carrying rods 76 engage, determine the manner of reciprocation of the plugs. It is apparent by reference to FIGS. 1 and 2, that as each plug rises and advances in the direction of travel of the vials, the cam moves the plug axially into the open end of a vial so that said plug 64 enters the vial and the collar 64a abuts the end of the vial or tube. A dwell 78 in the cam 74 holds the plugs in the vials the prescribed period of time. At the conclusion of the threading cycle, the plugs are retracted by a spring (not shown) which may, if desired, operate as in the apparatus of the Koenig patent. To insure such retraction beyond a doubt, a short curved pull-cam section 79 is positioned to engage the rolls 75 and positively retract the rod-carried plugs. The entrance end 80 of the cam then again engages the cam rolls 75 and advances the plugs as aforesaid. A supporting arm 81 for the cam 74 is adjustably mounted in a bracket 82, providing for positioning the cam as desired relative to the vial conveyor 10. A set-screw 83 locks the arm 81 in the bracket.

Figure 5:
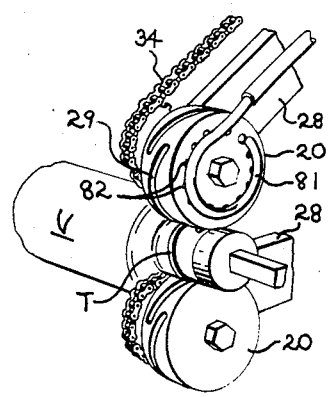
FIG. 5 is a fragmentary detail perspective view showing a modified form of drive for the threading dies.
Figure 6:
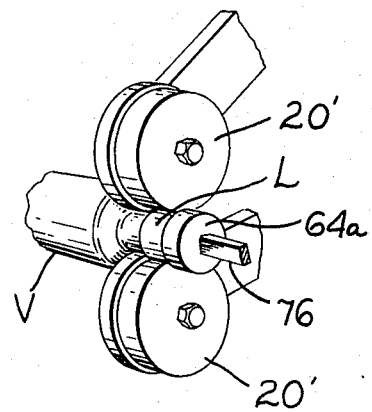
FIG. 6 is a view similar to FIG. 5 showing a lug or flange forming operation in another embodiment of my invention.

In a modified form of my invention, the threading dies 20 instead of being positively driven by means connected to the tube or vial rotating means, while connected together by sprockets and chains, are rotated by a stream of air under pressure from an air nozzle 81 directed against one end of a single die 20 as shown in FIG. 5. An annular series of apertures 82 are provided in the die to receive the air stream. Thus the die is driven in much the fashion of a turbine or water-wheel. The dies preferably are driven at peripheral speed somewhat higher than, or in any event no lower than the vials V or tubes. Thus, upon initial contact between the tubes and dies, the latter are already rotating and it is not necessary for the tube to initiate such dies rotation. Here rotation of the tube or vial in peripheral engagement with the dies 20 provides the power for rotating the dies and at the proper speed.

Another embodiment of the invention is shown in

Figure 7:
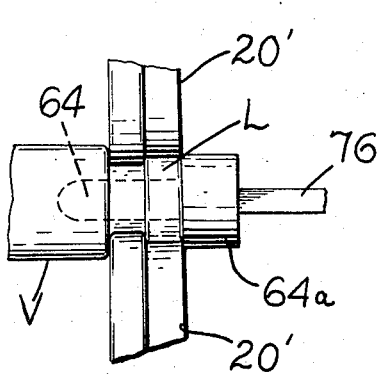
FIG. 7 is a fragmentary side elevational view of the lug forming cycle shown in FIG. 6.
Figure 8:
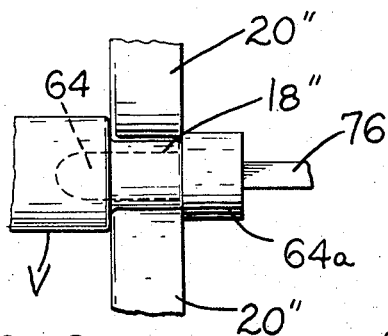
FIG. 8 is a view similar to FIG. 7 showing another embodiment wherein a uniform upsetting of the end portion is obtained.

FIGS. 6 and 7 wherein dies 20' have a stepped peripheral contour to facilitate the formation of a flange or lug L configuration at their open end. The pair of dies 20' are preferably driven at the same peripheral rate of speed as the vial end portion. The lug-type finish L is capable of being formed during the continuous horizontal travel of the vial, such finish being accurately tooled to receive a roll-on type metallic seal for pharmaceuticals. FIG. 7 illustrates one form of the lug L, however, many variations thereof are possible. A further form of the invention involves utilizing dies 20" having a smooth periphery to form a straight-sided neck 18" as shown in FIG. 8. In forming both the lug and straight-sided finishes, the internal plug or mandrel 64 is employed to penetrate the end and control the internal diameter of the vial, the flange 64a controlling formation of the lip area.

In addition to forming the screw-thread and lug-type finishes shown in the drawings, the small glass vials may have a series of ribs formed on their open-ends as shown in Patent No. 3,025,988 to H. W. Williams, which relates to tamperproof closures.

The mode of operation of the apparatus is deemed abundantly clear from the foregoing description.

Modifications may be resorted to within the spirit and scope of the appended claims.

I claim:

1. Combined apparatus for forming the open-end portion of tubular glass blanks with a finally-formed constricted configuration comprising means for continuously conveying the tubular glass blanks in succession and in horizontal recumbent position with their axes transverse to the movement of said conveying means through a forming zone, means for positively rotating the blanks about their axes during their conveyance, means for heat-softening the open-end portion of said blanks during conveyance prior to entry into said forming zone, a pair of rotatable, circular forming dies having their axes parallel to the axes of said blanks, means mounting said dies in predetermined spaced-apart juxtaposed array one above and one below the path of travel of the open-end portion of said blanks with the space therebetween being less than the external diameter of the end portion of the blanks whereby the means for continuously conveying the blanks will move the blanks into and through the space between the dies, with the dies forming the desired constricted configuration, means for internally supporting the sidewall of the open-end portion to be formed, and means for forwardly advancing both the pair of dies and said internal supporting means in the direction of movement of said conveying means in synchronism with each blank during its continuous travel through said forming zone.

2. Combined apparatus as defined in claim 1, wherein each of said dies are provided with similar peripheral contours adapted to form complemental external configuration on said blanks.

3. Combined apparatus as defined in claim 1, wherein said advancing means for dies comprises a die carrying slide movable in a plane parallel to the direction of conveyance of said blanks, and means timed with advance of said blanks for reciprocating said slide.

4. Combined apparatus as defined in claim 1, wherein said means for mounting said dies comprises, pivotally mounted arms supporting said dies and a frame member carrying said arms.

5. Combined apparatus for forming an external finish on a selected area of the open end portion of a cylindrical glass tube comprising means for advancing the tube continuously along a horizontal path extending perpendicular to the tube axis through tube end-softening and forming zones, heating means in the softening zone for locally heating the selected area to be formed, means for positively rotating the tube about its axis while advancing through said forming zone, a pair of freely-rotatable disc-like forming dies disposed in said forming zone in vertical array with their axes parallel to the axis of said tube, means mounting said dies in predetermined spaced-apart relationship with the space therebetween providing for peripheral contact with diametrically-opposed portions of the heat-softened area of the tube end portion as the tube is continuously advanced through the forming zone, means for retaining said dies in forming contact with said selected area of said tube whereby rotation of the tube effects corresponding rotation of said dies, and means for forwardly advancing said dies with the tube in the direction of said tube advancing means during its continuous travel through said forming zone to effect tube end formation in final form.

6. Apparatus as defined in claim 5, including support means removably positionable within said tube for supporting the heat-softened end portion against collapse during forming, said support means being laterally movable in synchronism with said dies in said forming zone.

7. Apparatus as defined in claim 5, further including driving means for imparting positive rotation to said dies such that the peripheral speed of the tube and dies are substantially equivalent during the interval when said dies engage said tube.

8. Apparatus as defined in claim 5, wherein said means for mounting said dies comprises a pair of pivoted arms one at each of opposing sides of the path of tube advance, means for adjusting said arms about their pivots to regulatably vary the spacing between said dies, and wherein said retaining means includes means yieldingly urging said dies toward each other.

9. Apparatus as defined in claim 5, wherein each die has a circumferential series of thread-forming channels formed on its periphery, which channels are of sufficient length to mold a complete thread, and further including means to effect free synchronous rotation of said dies prior to and during contact with said tube.

10. Apparatus as defined in claim 5, further including at least one solid mandrel adapted to reciprocable transverse movement to penetrate the open end portion of said tube to support the latter against collapse and having a surface abutting the extremity of said tube open end to restrict glass flow.

11. Apparatus as defined in claim 10, further including a plurality of said mandrels, means for moving said mandrels in series in a path parallel to that of tube advance in the forming zone with a mandrel and tube in coaxial alignment during forming, and means for moving said mandrels axially in said forming zone.

12. Apparatus for forming an external screw-thread finish on an open end portion of a tubular glass workpiece comprising means for heat-softening the open end portion of said workpiece to a deformable plastic state, a pair of disc-like thread-forming dies, means mounting said dies on parallel axes in vertical array with their adjacent peripheral surfaces at a predetermined spaced-apart distance corresponding substantially to the root diameter of the thread to be formed on the workpiece, means to rotate said dies at the same peripheral velocity, means for continuously advancing the tubular workpiece with its axis parallel to the axes of said dies to thereby move its heat-softened end portion into contact with said rotating dies, the axes of said workpiece and said dies being transverse to the movement of said advancing means, means for positively rotating the workpiece at the same peripheral velocity as said dies during the interval of its continuous advancement in contact with the dies to form a screw-thread on said open end portion, means providing internal support for said open end portion during the interval of thread formation, means for reciprocatably advancing and retracting said dies in a direction parallel to the movement of said workpiece advancing means during the threading and return cycles comprising a horizontal slide supporting said dies, and means operating in timed relation to advance the workpiece and reciprocate the slide.

13. Apparatus as defined in claim 12, wherein said means operating in timed relation comprises a lever and a cam for rocking said lever, said lever being connected to the slide at one end, a cam roller at the other end of said lever, an arm carrying said cam roller and pivotally connected to said lever, and means for adjusting the arm about its pivot to regulatably determine the location of the threading zone of said dies.

14. Apparatus as defined in claim 12, wherein said means for advancing and retracting the thread-forming means comprises a slide-supported carrier for the thread-forming means and cam means for reciprocating the slide and carrier in timed relation to opeatrion of the tube moving means.

References Cited

UNITED STATES PATENTS

| 2,952,943 | 9/1960 | Zauner | 65—296 |
| 3,171,730 | 3/1965 | Zauner | 65—109 |
| 3,257,186 | 6/1966 | Zauner | 65—109 |

DONALL H. SYLVESTER, *Primary Examiner.*

A. D. KELLOGG, *Assistant Examiner.*